United States Patent
Murata et al.

[15] 3,666,703
[45] May 30, 1972

[54] FOUNDRY SAND COMPOSITION FOR CORES AND MOLDS

[72] Inventors: Takao Murata, Yaizu; Atsushi Kudo, Fujieda, both of Japan

[73] Assignee: Sumitomo Durez Company, Ltd., Tokyo, Japan

[22] Filed: May 13, 1969

[21] Appl. No.: 824,253

[52] U.S. Cl. ............................. 260/29.3, 260/29.4, 260/38
[51] Int. Cl. ....................................... C08g 51/24, C08g 5/06
[58] Field of Search ............... 260/29.3, 29.6 S, 29.7 S, 29.4, 260/38

[56] References Cited

UNITED STATES PATENTS

| | | | |
|---|---|---|---|
| 2,806,832 | 9/1957 | Drumm et al. | 260/38 |
| 3,050,797 | 8/1962 | Freedman et al. | 260/38 |
| 3,216,966 | 11/1965 | Collins et al. | 260/38 |
| 2,869,191 | 1/1959 | Cooper et al. | 260/29.3 |
| 2,869,194 | 1/1959 | Cooper | 260/29.3 |
| 2,869,196 | 1/1959 | Cooper et al. | 260/29.3 |
| 3,116,522 | 1/1964 | Taylor | 260/38 |
| 3,240,736 | 3/1966 | Beckwith | 260/38 |
| 3,297,599 | 1/1967 | Eschen | 260/38 |

FOREIGN PATENTS OR APPLICATIONS

| | | | |
|---|---|---|---|
| 562,268 | 6/1944 | Great Britain | 260/38 |
| 231,242 | 3/1925 | Great Britain | 260/29.3 |
| 470,843 | 1/1951 | Canada | 260/29.3 |

*Primary Examiner*—Donald J. Arnold
*Attorney*—Peter F. Casella, Donald C. Studley, Richard P. Mueller and James F. Mudd

[57] ABSTRACT

In the production of foundry molds and cores, foundry sand grains are bound together with a binder composition comprising a mixture of (1) an aqueous phenolic resin prepared by reacting a mixture of phenol and formaldehyde in the range of 1:1.8 and 1:3.0, and optionally containing urea as a third component, and (2) cement such as Portland cement, alumina cement, magnesia cement and dolomite cement. Accelerators such as alkali metal carbonates, alkaline earth metal oxides and other metal oxides which are capable of forming coordinate bonds are also employed in the compositions. Molds and cores formed from the foregoing compositions are self-curing at room or ambient temperature in a short time.

9 Claims, No Drawings

FOUNDRY SAND COMPOSITION FOR CORES AND MOLDS

DESCRIPTION OF PREFERRED EMBODIMENTS

This invention relates to the novel compositions for making foundry cores and molds which can be cured at room temperature. More particularly, the present invention relates to the compositions for shaping foundry cores and molds which consist of inorganic filling materials such as silica, alumina or chromite sand, aqueous phenolic resins as a binder, cements as an additive, metal salts such as sodium carbonate and so forth as an accelerator, and water.

The composition for foundry cores and molds in this invention is capable of curing rapidly at the room temperature and then shows enough strength as foundry molds and cores.

Recently, there is a sand mold called a "self-hardening type" which is cured in a short time as possible at room temperature after the shaping operation, and the distinctive features of these mold and core compositions are to omit the drying and hot-curing operation of the usual foundry mold process, and on the other hand, to abbreviate the tamping operation of the conventional shaping process by fluidization of the foundry sand mixture. The compositions for foundry cores and molds based on the present invention also have such characteristics.

There are already various kinds of binding materials recommended for self-hardening molds and cores, which can be classified into two groups; that is, organic binders such as drying oils, thermosetting resins, etc, and inorganic binders such as water glass, plaster of Paris, cements and so forth. Generally speaking, the merits of using organic binders over inorganic binders are shown by their good collapsibility of molds and cores, and by the excellent mold strength in the case of using equal weight of additives to sand. However, the demerits for organic binders are that they cost about 10 times higher than inorganic binders, and molds have a tendency to collapse during casting in the case of large-sized molds due to lack in heat resistance of the binder.

On the other hand, there is the cement mold which is a typical inorganic binder type self-hardening one already in use for a long time. The cement mold is usually made by a combined mixture of 100 parts of sand, 10 to 20 parts of cement and 10 to 15 parts of water. This type has such defects that it is not easy to control the hardening time and also it needs a long time for hardening. Therefore, various kinds of hardening accelerators for improvement of those defects have been improvised. Mitsubishi's "Hard-Fluid Process" which was developed and publicized by Mitsubishi Heavy Industry Co., Ltd., and the "Grout Process" which was developed and publicized by Ebara Works Co., Ltd. belong to this category. A process using an inorganic binder which attracted very much attention recently, which was developed in the Soviet Union and described in the Japanese Pat. Publication No. 8205/1967 titled "A fluid mixture for making foundry cores and molds," stresses its characteristics of fluidization and self-hardenability of the mixture which consists of foundry sand, water glass, dicalcium silicate, surface active agent and water.

As described above, many kinds of organic and inorganic binders are invented and publicized already, but none of those are satisfactory from the composite view-point including cost, workability, hardenability, and collapsibility of foundry molds and cores, etc.

The mixture for making molds and cores which consist of inorganic filling materials such as silica sand, chromite sand and so forth, cements, aqueous phenolic resins, metal salts such as sodium carbonate and water, based on the present invention remedies the defects possessed respectively by usual organic and inorganic binders, and is characterized by causing a mutual reaction and bonding between a special aqueous phenolic resin as an organic material and cements as an inorganic ingredient. Generally, phenolic resins have properties that are converse from those of cements, therefore, it tends to delay the hardening of cement when aqueous phenolic resin is added to cement, and sometimes it perfectly prevents the hardening of cement. However, in this invention we have found a special aqueous phenolic resin which mixes easily and contributes to the hardening of cements.

Among the cements which can be used in the present invention, Portland cement is most effective and alumina cement, magnesia cement, dolomite cement and so forth are also effective. As accelerators which can be used in this invention, sodium carbonate is most effective, and moreover alkali metal carbonates, alkaline earth metal oxides and other metal oxides which are capable of forming coordinate bonds, such as potassium carbonate, magnesium oxide, calcium oxide, zinc oxide, etc. are also effective. These compounds are useful for accelerating the hardening of cements and aqueous phenolic resins by adding individually or by an admixture of more than two kinds.

The resin solid content of the aqueous phenolic resin which can be used in the present invention is 30 to 80 percent by weight. Powdered form which is spray-dried from the above liquid may also be used. The resin solutions are made by reacting a mixture of phenol and formaldehyde being in the range of 1:1.8 and 1:3.0 by molar ratio with pH more than 10.0 by adding alkali. It is preferable to use caustic soda or caustic potash as alkali in the above reaction. Especially, it is more effective to use the modified phenolic resin in which part of the phenol is substituted with urea. Liquid urea resins are to some degree effective, but the molds can be used only in the case of aluminium casting, on account of insufficient heat resistance of the resin.

For self-hardening foundry molds and cores based on the present invention, recommendable mixture compositions are as follows: (In the mention of the present specification, all "-parts" are by weight unless specified otherwise.)

| | |
|---|---|
| (a) foundry sand | 100 parts |
| (b) aqueous urea modified phenolic resin (resin solid content 50%) | 2–5 parts |
| (c) Portland cement | 1–5 parts |
| (d) sodium carbonate | 1–2 parts |
| (e) water | 0.1–10 parts |

Generally speaking, the aqueous phenolic resins which are to be used here should preferably have about 50 percent resin solid content, to be in the range between 3 to 10 poises in viscosity which are comparatively high, and to be about 11 in pH. Addition of a suitable surface active foaming agent to grant fluidity to the mixed sand is also recommendable for the above formulation. The following are examples of the present invention.

EXAMPLE 1

1,000 parts of phenol, 435 parts of neutralized formalin (37 percent formaldehyde), and 20 parts of aqueous oxalic acid solution (50 percent oxalic acid) were charged into a reaction vessel, and reacted 30 minutes at 80°C. Then the temperature of the reacting liquid was lowered to 50°C. and 90 parts of 30 percent aqueous caustic soda solution and 1,165 parts of 37 percent neutralized formalin were added to the liquid, then the resulting liquid was heated again to 100°C. with precaution and reacted for 30 minutes at that temperature. Then the reacted liquid was cooled to room temperature as rapidly as possible, and a resol type aqueous phenolic resin having the following properties was obtained.

| | |
|---|---|
| Specific Gravity (at 25° C.): | 1.185 |
| Viscosity (at 25° C) | 3.0 poises |
| pH: | 12.5 |
| Gelation Time (at 130° C) | 20 minutes |
| Resin Solid Content: | 42 percent |

EXAMPLE 2

180 parts of urea (industrial use grade), 94 parts of phenol, 648 parts of 37 percent neutralized formalin, 1.24 parts of sodium acetate and 0.72 part of 50 percent aqueous acetic acid solution were charged into a reaction vessel having a reflux condenser and heated slowly to 100°C within 10 minutes, then reacted 45 minutes at that temperature. Subsequently 752 parts of phenol and 8 parts of oxalic acid were added and reacted 25 minutes more at 100°C, 1,000 parts of 37 percent neutralized formalin and 424 parts of 30 percent aqueous caustic soda solution added further, then reacted for 30 minutes at 100°C. After adding 290 parts of 30 percent aqueous caustic soda solution carefully, the resulting liquid mixture was cooled to room temperature rapidly; finally the urea modified phenolic resin liquid was discharged from the reaction vessel. The properties of the resin were as follows:

| | |
|---|---|
| Appearance: | brown liquid |
| Specific Gravity (at 25° C): | 1.190 |
| Viscosity (at 25° C): | 4.5 poises |
| pH: | 11.5 |
| Gelation Time (at 130° C) | 20 minutes |
| Resin Solid Content: | 50 percent |

EXAMPLE 3

180 parts of urea (industrial use grade), 94 parts of phenol, 648 parts of 37 percent neutralized formalin, 1.24 parts of sodium acetate and 0.72 part of 50 percent aqueous acetic acid solution were charged into a reaction vessel having a reflux condenser, heated to 100°C in 10 minutes, and then reacted 45 minutes at that temperature. After addition of 752 parts of phenol and 8 parts of oxalic acid, the liquid mixture was reacted for 25 minutes at 100°C. Subsequently 1,000 parts of 37 percent neutralized formalin and 424 parts of 30 percent aqueous caustic soda solution were added and reacted for 30 minutes at 100°C, then 290 parts of 30 percent aqueous caustic soda solution were added carefully, and after the addition the resulting liquid mixture was cooled to room temperature as rapidly as possible. The viscosity of the reacted resin solution was 3.5 poises at 25° C.

Then the reacted liquid resin were converted into amorphous powder by eliminating water in a spray dryer with its dry air under 100°C, and the powdered resins, made from solutions with a solid content below 70 percent were easily soluble in water.

EXAMPLE 4

Aqueous phenolic resin and/or urea modified phenolic resin obtained from example 1 and/or 3, silica sand, cement, liquid or powdered resin, accelerator and water were charged sequentially into a Simpson Mill or a whirl mixer according to the formulations shown in the upper section of table I, and mixed for 3 minutes to make a fully uniform mixture. The resulting mixture was made into test specimens having a size 50 × 50 mm by the procedure specified by the Japanese Industrial Standard JIS Z-2604, and they were tested for compressive strength, surface stability, and residual strength after heating under high temperature by changing the dwelling time. The results are as shown in lower section of table I.

Therein, surface stability is expressed as percent ratio of the residual weight to the original weight of the test specimen, which was shaken 2 or 3 minutes on a 6 mesh sieve by a Ro-tap shaking machine (having a rotating and tapping combination motion). And then, residual strength is the compressive strength of the test specimen which was left 24 hours at room temperature and then heated within the fixed time in a heating oven kept at the fixed temperature.

Foundry molds and cores formed by binders based on formulations of the present invention using the resins prepared by example 1 and/or 3 were shown to have very good collapsibility after the casting operation, and, on the other hand, smooth surface castings with little need of final finishing operation were obtained.

TABLE I

[Formulation of the mixture composition and their properties after hardening]

| | Test number | | | | |
|---|---|---|---|---|---|
| | 1 | 2 | 3 | 4 | 5 |
| Items | Resin group | | | | |
| | Example 1 | | Example 2 | | Example 3 |
| Formulation (parts by weight): | | | | | |
| Liquid resin | 5 | 5 | 5 | 5 | |
| Powdered resin | | | | | 5 |
| Silica sand (No. 6) | 100 | 100 | 100 | 100 | 100 |
| Portland cement | 1 | 2 | | | 2 |
| Magnesia cement | | | 2 | | |
| Dolomite cement | | | | 2 | |
| Sodium carbonate | 1 | 1 | | | 1 |
| Magnesium oxide | | | 1 | 1 | |
| Water | | | | | 5 |
| Tested value: | | | | | |
| Compressive strength (kg./cm.²): | | | | | |
| After 1 hour | 2.0 | 2.5 | 1.5 | 3.0 | 5.0 |
| After 2 hours | 4.8 | 5.3 | 3.4 | 5.1 | 9.5 |
| After 4 hours | 11.7 | 12.6 | 10.5 | 11.4 | 15.3 |
| After 24 hours | 30.0 | 18.5 | 17.8 | 21.2 | 23.2 |
| Surface stability (percent): | | | | | |
| After 2 minutes shaking | 92.9 | 94.1 | 89.3 | 90.5 | 93.5 |
| After 3 minutes shaking | 90.3 | 91.3 | 85.1 | 87.3 | 91.4 |
| Residual strength (kg./cm.²): | | | | | |
| After heating 30 minutes: | | | | | |
| at 800° C | 1.0 | 1.0 | 1.5 | 1.0 | 1.2 |
| at 1,000° C | 0.4 | 0.5 | 0.7 | 0.6 | 0.3 |

In the practice of the invention, the following proportions of components generally are used, but smaller or larger proportions can be employed depending on the desired properties of the foundry compositions.

| | |
|---|---|
| Foundry Sand | 100 parts |
| Aqueous Phenolic Resin | 2-5 parts |
| Cement | 1-5 parts |
| Accelerator | 1-2 parts |
| Water | 0.1-10 parts |

The aqueous phenolic resin can have a solid content of about 25 to 80 percent.

When the phenolic resins of the invention comprise phenol, formaldehyde and urea, the components are employed in a molar ratio of phenol plus urea to formaldehyde of about 1:1.3 to about 1:4.8 and to provide a urea content of about 4 to 25 weight percent.

The disclosure of United States Pat. No. 3,306,864 is incorporated herein by reference.

Various modifications can be made in the invention without departing from the spirit thereof. Therefore, we do not wish to be limited by specific details set forth in the foregoing specification.

We claim:

1. A foundry sand composition for cores and molds comprising a wet mixture of foundry sand, and the following components based on 100 parts by weight of said foundry sand: 2 to 5 parts of an aqueous resin consisting essentially of (a) the reaction product of phenol and formaldehyde wherein the molar proportion to formaldehyde is 1:1.8 to 1:3.0 and the pH is more than 10, or (b) the reaction product of phenol, formaldehyde and urea wherein the molar ratio of phenol plus urea to formaldehyde is about 1:1.3 to about 1:4.8 and the urea content is about 4 to 25 weight percent, 1 to 5 parts of cement selected from the group consisting of Portland cement, alumina cement, magnesia cement, and dolomite cement, 0.1 to 10 parts water and 1 to 2 parts of an accelerator selected from the group consisting of an alkali metal carbonate and an alkaline earth metal oxide.

2. The composition of claim 1 wherein the resin is a one-step phenol formaldehyde resin.

3. The composition of claim 2 wherein the accelerator is sodium carbonate.

4. The composition of claim 1 wherein the resin is the reaction product of phenol, formaldehyde and urea.

5. The composition of claim 4 wherein the accelerator is sodium carbonate.

6. The composition of claim 4 wherein the accelerator is magnesium oxide.

7. A foundry mold or core composition comprising foundry sand and a resinous binder composition comprising components in the following proportions based on 100 parts by weight of foundry sand: 2 to 5 parts of a resin consisting essentially of (a) the reaction product of phenol and formaldehyde wherein the molar proportion of phenol to formaldehyde is 1:1.8 to 1:3.0 and the pH is more than 10, or (b) the reaction product of phenol, formaldehyde and urea wherein the molar ratio of phenol plus urea to formaldehyde is about 1:1.3 to about 1:4.8 and the urea content is about 4 to 25 weight percent; 1 to 5 parts of cement selected from the group consisting of Portland cement, alumina cement, magnesia cement, and dolomite cement, and 1–2 parts of an accelerator selected from the group consisting of an alkali metal carbonate and an alkaline earth metal oxide.

8. A process for binding foundry sand grains which comprises admixing sand with a resinous binder composition to produce a wet mixture comprising components in the following proportions based on 100 parts by weight of foundry sand: 2 to 5 parts of a resin consisting essentially of (a) the reaction product of phenol and formaldehyde wherein the molar proportion of phenol to formaldehyde is 1:1.8 to 1:3.0 and the pH is more than 10, or (b) the reaction product of phenol, formaldehyde and urea wherein the molar ratio of phenol plus urea to formaldehyde is about 1:1.3 to about 1:4.8 and the urea content is about 4 to 25 weight percent; 1 to 5 parts of cement selected from the group consisting of Portland cement, alumina cement, magnesia cement, and dolomite cement, 1 to 2 parts of an accelerator selected from the group consisting of an alkali metal carbonate and an alkaline earth metal oxide and 0.1 to 10 parts water; and permitting said wet mixture to cure at a temperature of at least room temperature.

9. A process for preparing foundry molds and cores which comprises admixing foundry sand with a resinous binder composition comprising components in the following proportions based on 100 parts by weight of foundry sand: 2 to 5 parts of a resin consisting essentially of (a) the reaction product of phenol and formaldehyde wherein the molar proportion of phenol to formaldehyde is 1:1.8 to 1:3.0 and the pH is more than 10, or (b) the reaction product of phenol, formaldehyde and urea wherein the molar ratio of phenol plus urea to formaldehyde is about 1:1.3 to about 1:4.8 and the urea content is about 4 to 25 weight percent; 1 to 5 parts of cement selected from the group consisting of Portland cement, alumina cement, magnesia cement, and dolomite cement, 1 to 2 parts of an accelerator selected from the group consisting of an alkali metal carbonate and an alkaline earth metal oxide and 0.1 to 10 parts water to yield a wet mixture;

adding the wet mixture to a core box to form a mold or core of the desired shape; and permitting the wet mixture to cure without addition of heat.

* * * * *